(12) United States Patent
Czainski et al.

(10) Patent No.: US 10,217,552 B2
(45) Date of Patent: Feb. 26, 2019

(54) DEVICE AND METHOD FOR ADJUSTING AN INDUCTANCE OF AN ELECTRIC CONDUCTOR

(71) Applicant: Bombardier Primove GmbH, Berlin (DE)

(72) Inventors: Robert Czainski, Doluje (PL); Daniel Wilhelm Oellingrath, Neckarsteinach (DE)

(73) Assignee: Bombardier Primove GmbH, Berlin (DE)

( * ) Notice: Subject to any disclaimer, the term of this patent is extended or adjusted under 35 U.S.C. 154(b) by 0 days.

(21) Appl. No.: 15/537,073

(22) PCT Filed: Dec. 16, 2015

(86) PCT No.: PCT/EP2015/079935
§ 371 (c)(1),
(2) Date: Jun. 16, 2017

(87) PCT Pub. No.: WO2016/096949
PCT Pub. Date: Jun. 23, 2016

(65) Prior Publication Data
US 2017/0352456 A1    Dec. 7, 2017

(30) Foreign Application Priority Data
Dec. 18, 2014   (GB) .................... 1422575.9

(51) Int. Cl.
*H01F 27/25*    (2006.01)
*H01F 3/14*     (2006.01)
*H01F 27/26*    (2006.01)
*H01F 27/02*    (2006.01)
*H01F 17/06*    (2006.01)
*B60L 9/24*     (2006.01)
(Continued)

(52) U.S. Cl.
CPC ............. *H01F 3/14* (2013.01); *H01F 27/025* (2013.01); *H01F 27/263* (2013.01); *B60L 9/24* (2013.01); *B60L 11/182* (2013.01); *H01F 38/14* (2013.01); *H01F 2017/065* (2013.01)

(58) Field of Classification Search
CPC .......................................... H01F 27/00–27/36
USPC ................... 336/10, 87, 90, 174–175, 210
See application file for complete search history.

(56) References Cited

U.S. PATENT DOCUMENTS 5,942,964 A * 8/1999 Takeuchi ............. H05K 9/0066
                                                       174/92
6,753,752 B1   6/2004 Lin
(Continued)

FOREIGN PATENT DOCUMENTS

CN        1514451 A    7/2004
CN      101501793 A    8/2009
(Continued)

*Primary Examiner* — Tuyen Nguyen
(74) *Attorney, Agent, or Firm* — The Webb Law Firm

(57) ABSTRACT

The invention relates to a device and a method for adjusting an inductance of at least one electric conductor. The device includes an adjustment arrangement with a first magnetically conductive element and at least a second magnetically conductive element. The adjustment arrangement includes at least a first spacer element arranged in between the first magnetically conductive element and the second magnetically conductive element.

13 Claims, 3 Drawing Sheets

(51) Int. Cl.
*B60L 11/18* (2006.01)
*H01F 38/14* (2006.01)

(56) References Cited

U.S. PATENT DOCUMENTS

| | | | |
|---|---|---|---|
| 7,859,378 B2 * | 12/2010 | Merck | G01R 1/22 336/174 |
| 2003/0222748 A1 * | 12/2003 | Cern | H01F 19/08 336/178 |
| 2005/0001707 A1 | 1/2005 | Elliott et al. | |
| 2006/0192646 A1 | 8/2006 | Hanley | |
| 2007/0176723 A1 | 8/2007 | Renz et al. | |
| 2009/0277571 A1 | 11/2009 | Uemura | |
| 2009/0315663 A1 | 12/2009 | Kiyono et al. | |
| 2010/0066475 A1 | 3/2010 | Goldblatt | |
| 2010/0109826 A1 | 5/2010 | Sano et al. | |
| 2013/0265129 A1 | 10/2013 | Ansari et al. | |
| 2014/0241011 A1 | 8/2014 | Nomura et al. | |

FOREIGN PATENT DOCUMENTS

| | | |
|---|---|---|
| CN | 103366926 A | 10/2013 |
| CN | 203966772 U | 11/2014 |
| GB | 2327816 A | 2/1999 |
| JP | 8111322 A | 4/1996 |
| WO | 9930402 A1 | 6/1999 |

\* cited by examiner

DEVICE AND METHOD FOR ADJUSTING AN INDUCTANCE OF AN ELECTRIC CONDUCTOR

CROSS-REFERENCE TO RELATED APPLICATIONS

This application is the United States national phase of International Application No. PCT/EP2015/079935 filed Dec. 16, 2015, and claims priority to United Kingdom Patent Application No. 1422575.9 filed Dec. 18, 2014, the disclosures of which are hereby incorporated in their entirety by reference.

BACKGROUND OF THE INVENTION

Field of the Invention

The invention relates to a device and a method for adjusting an inductance of an electric conductor, in particular an electric conductor for connecting a feeding source to a primary winding structure of a system for inductive power transfer to a vehicle.

Desription of Related Art

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of e.g. three-phase winding structures. A first set is installed on the ground (primary windings or primary winding structure) and can be fed by a wayside power converter (WPC). The way-sided elements of the inductive power transfer system can also be referred to as primary-sided elements.

The second set of windings is installed on the vehicle. For example, the second set of windings can be attached underneath the vehicle, in the case of trams under some of its wagons. For an automobile it can be attached to the vehicle chassis. The second set of windings is often referred to as pick-up-arrangement or receiver. The vehicle-sided elements of the inductive power transfer system can also be referred to as secondary-sided elements.

The first set of windings and the second set of windings form a high frequency transformer to transfer electric energy to the vehicle. This can be done in a static state (when there is no movement of the vehicle) and in a dynamic state (when the vehicle moves). In particular in the case of road automobiles, a stationary primary unit comprises a plurality of elements which are often arranged spatially separated.

The system for inductive power transfer has resonance circuits, e.g. for generating the power transfer field. These resonant circuits comprise inductivities and capacities, wherein the capacities are mostly provided by capacitors. Inductivities are provided by e.g. choking coils or by windings, in particular the aforementioned primary windings.

In addition to the primary winding structure, a primary-sided electric circuit can e.g. comprise an electric connecting network for electrically connecting the primary winding structure and a feeding source for providing an operating voltage/current to the primary winding structure.

This electric connecting network can comprise inductivities and capacities. Further, the electric connecting network can comprise at least one electric conductor which provides at least a part of the electric connection between the feeding source and the primary winding structure. Thus, the inductivity of a primary-sided electric circuit or a part thereof can be provided by an inductivity of said electric conductor.

It is further desirable to tune the high frequency transformer in order to maximize the amount of power transferred by the inductive power transfer. The tuning of the inductive power transfer system can comprise adjusting inductances and/or capacitances on the primary and/or the secondary side in order to minimize a reactive power generated by the inductive power transfer system.

It has been known to provide so called compensating capacitances, e.g. on the secondary side, in order to tune a resonant frequency of the secondary-sided resonant circuit to an operating frequency of the inductive power transfer system.

Changing electric parameters of electric components of the inductive power transfer system, however, usually requires a high labour-intensity, e.g. for opening a housing of the primary-sided system or the receiving device, in particular during a final adjustment during installation of the inductive power transfer system.

Other approaches use active elements such as switches in order to connect additional capacitors or inductors to an electric circuit for varying a total capacitance or total inductance.

WO 99/30402 discloses an inductor apparatus, wherein a ferrimagnetic core comprising one or ferrite elements having a "C"-shape or modified toroidal ferrite core including an air gap is threaded over about 1 turn of litz wire.

SUMMARY OF THE INVENTION

It is an object of the present invention to provide a device and a method for adjusting an inductance of an electric conductor in order to tune an inductive power transfer system, wherein a required amount of work is minimized and an implementation complexity is reduced.

A device for adjusting an inductance of an electric conductor is proposed. The electric conductor can e.g. be an electric conductor for connecting a feeding source to a primary winding structure of an inductive power transfer system. The feeding source can e.g. be an AC voltage/current source, in particular a converter. Thus, electric power is supplied to the primary winding structure by the electric conductor, in particular electric power for generating an alternating electromagnetic field.

As explained before, the electric conductor can be part of an electric connecting circuit by which the primary winding structure and the feeding source is connected. The electric connecting circuit can e.g. also comprise an electric network of inductivities and capacities. In particular, the electric conductor can be a feeder or a feed line of the primary winding structure or a part thereof. In particular, the electric conductor can be an electric conductor for an alternating current.

The primary winding structure can comprise multiple, e.g. three, phase lines, wherein each of the phase lines can be connected to the feeding source by an electric conductor. In this case, the electric connecting circuit can comprise multiple, e.g. three, electric conductors.

The proposed device comprises an adjustment arrangement with a first magnetically conductive element and at least a second magnetically conductive element. The first and/or the second magnetically conductive element can e.g. be provided by ferrite elements. In general, the first and the second magnetically conductive elements have a magnetic conductivity which is higher than a predetermined threshold value. In particular, the relative magnetic permeability of the magnetically conductive elements can e.g. be higher than 1, preferably higher than 100, and/or lower than 200000.

The first and the second magnetically conductive element can be designed as separate elements.

According to the invention, the adjustment arrangement further comprises at least a first spacer element, wherein the at least first spacer element is arranged in between the first conductive element and the second magnetically conductive element, in particular in an interspace between the first and the second magnetically conductive element. In particular, the at least one spacer element can be arranged in between the first and second magnetic element such that a desired minimal distance between the first magnetically conductive element and the second magnetically conductive element is provided, in particular a minimal distance larger than 0.0 mm, more particular larger than or equal to 2.0 mm.

The spacer element can be made of a material which is different from the material of the first and/or the second magnetically conductive element. In particular, the spacer element can have a relative magnetic permeability less than 100. It is further possible that the spacer element can have a relative magnetic permeability smaller than the relative magnetic permeability of the magnetically conductive elements.

That the at least first spacer element is arranged in between the first and the second magnetically conductive element can mean that the at least first spacer element is arranged such that magnetic field lines which extend from the first to the second magnetically conductive element extend through the first spacer element and/or magnetic field lines which extend from the second magnetically conductive element to the first magnetically conductive element extend through the first spacer element. In other words, the first spacer element can be magnetically arranged between the first and the second magnetically conductive element.

The first spacer element provides a desired distance between the first and the second magnetically conductive element, wherein a resulting inductance variation of the electric conductor depends on said distance. The distance can e.g. be equal to a height or thickness of the first spacer element. The inductance variation can also be referred to as inductance change.

The adjustment arrangement can comprise or provide at least one receiving means for receiving the electric conductor or even multiple, e.g. two, electric conductors or at least (a) section(s) thereof. It is for instance possible that the adjustment arrangement provides a through-hole through which the electric conductor can extend. Dimensions of said through-hole can be adapted to a geometric size of the electric conductor(s).

It has been shown that an inductance variation of a section of the electric conductor which e.g. extends through the adjustment arrangement depends on the distance in a hyperbolic way.

This means that a maximal inductance variation is provided if the minimal possible distance between the first magnetically conductive element and the second magnetically conductive element is provided. Theoretically, the maximum possible inductance variation is provided if no distance, i.e. a zero distance, is provided between the first and the second magnetically conductive element. The higher the distance, the smaller the inductance variation, i.e. the inductance change, due to the arrangement of an additional spacer element. It is possible that multiple spacer elements, e.g. spacer elements with different heights, can be provided wherein the spacer elements are designed such that all inductance variations which are provided by the arrangement of one additional spacer element are equal. In this case, the height of different spacer elements can increase in a hyperbolic way.

In the case of small distances, in particular in the case of a zero distance, the inductance variation can also depend on saturation characteristics of the magnetically conductive elements.

It is, of course, possible, that the device comprises multiple adjustment arrangements which are arranged along the course of one electric conductor. The distances provided by the first spacer element of each adjustment arrangement can be equal or can vary in order to provide a desired inductance of the electric conductor.

It is further possible that the device comprises one or multiple adjustment arrangements for each electric conductor of a set of multiple electric conductors. The set of multiple electric conductors can e.g. comprise one electric conductor per phase line of the primary winding structure by which the respective phase line is connected to the aforementioned feeding source. The distances provided by the first spacer element of each adjustment arrangement and/or the distribution of multiple adjustment arrangements along one electric conductor can be chosen such that a desired symmetric or desired asymmetric distribution of the phase line-related inductivities is provided. The phase line-related inductivity can denote an inductivity provided by the inductivity of the phase line and the inductivity of the electric connecting circuit by which the phase line is connected to the feeding source.

The distance can e.g. be chosen from an interval from 2.0 mm (inclusive) to 10.0 mm (inclusive). Thus, a height of the first spacer element can also be chosen from an interval ranging from 2 mm (inclusive) to 10 mm (inclusive).

Further, the adjusting arrangement comprises at least one additional spacer element, wherein the at least one spacer element is arranged outside an interspace in between the first and the second magnetically conductive element. As in the case of the first spacer element, the additional spacer element can also be I-shaped. In particular, the at least one additional spacer element can be arranged below the first magnetically conductive element or above the second magnetically conductive element. It is, of course, possible, that the adjustment arrangement comprises multiple additional spacer elements, wherein at least one additional spacer element is arranged below the first magnetically conductive element and/or at least one additional spacer element is arranged above the second magnetically conductive element. The heights of the multiple additional spacer elements can vary.

This advantageously allows adjusting a geometric dimension of the adjustment arrangement to a dimension of a receiving volume of a housing, wherein the arrangement of the adjustment arrangement within receiving volume of the housing provides a stable assembly of the elements of the adjustment arrangement. The additional spacer element(s) can be made of the same material as the aforementioned spacer element which is arranged in the interspace between the first and the second magnetically conductive element.

In summary, an easy-to-install device for adjusting the inductance of an electric conductor is proposed. By varying the thickness or the height of the first spacer element, the distance between the first and the second magnetically conductive element and thus the inductance variation be changed. The device advantageously allows adjusting the inductance of an electric circuit without opening a housing of electric components, e.g. the housing of a converter and/or a primary winding structure. Another advantage is that the electric device can be used to change an inductance of a primary-sided electric circuit after installation.

Further, the proposed device has only small installation space requirements and does not require an implementation of complex mechanical and electrical components for an automatic adjustment of electric characteristics such as variable or switchable capacitors or coils. Further, installation costs are minimized. As feeder-lines are usually easy accessible, an insulation effort is reduced. Further, there is no risk of an undesired overheating or damage of the proposed device. Another advantage is that losses produced by the installation of a proposed device are usually small.

Further, the proposed device can be adapted to different electric circuits which have to be tuned, in particular to different primary-sided electric circuits of an inductive power transfer system. Thus, the device allows a flexible adjustment of the inductivities of different systems. As electric elements of the aforementioned primary-sided electric circuit usually vary, e.g. due to manufacturing tolerances, this flexibility is highly desirable. The geometric design, e.g. geometric dimensions and/or geometric shape, of the first and the second magnetically conductive element can be chosen depending on a maximum current and/or frequency of the current conducted by the electric conductor.

In another embodiment, the first magnetically conductive element is U-shaped. This can mean that the first magnetically conductive element is provided by a U-profile and/or a cross section of the first magnetically conductive element is U-shaped. In particular, the first magnetically conductive element can have a bottom section and two wall sections, wherein the wall sections extend from the bottom section. The bottom section and the wall section can enclose an inner volume which can provide the aforementioned through-hole for the electric conductor(s).

Alternatively or in addition, the second magnetically conductive element is I-shaped. This can mean that the second magnetically conductive element is provided by an I-profile and/or a cross section through the second magnetically conductive element is I-shaped. In particular, the cross section can have a rectangular shape. In other words, the second magnetically conductive element can be provided by cuboid or a bar of magnetically conductive material.

Alternatively or in addition, the spacer element is I-shaped. This can mean that the first spacer element is provided by an I-profile and/or a cross section through the first spacer element is I-shaped. In particular, the cross section can have a rectangular shape. In other words, the first spacer element can be provided by cuboid or a bar.

For the present description a Cartesian reference system can be referred to. The Cartesian coordinate system can define a longitudinal direction, wherein a length can be measured along said longitudinal direction. Further, the Cartesian coordinate system can define a lateral direction, wherein a width can be measured along said lateral direction. Further, the Cartesian coordinate system can define a vertical direction, wherein a height can be measured along the vertical direction. Directional terms such as "above" and "below" can relate to the aforementioned vertical direction of the reference coordinate system, wherein the vertical direction can be oriented upwards if it is oriented from the first magnetically conductive element towards the second magnetically conductive element.

In an assembled state of the adjustment arrangement, the second magnetically conductive element can be arranged above or on top of the first magnetically conductive element, wherein the first spacer element is arranged in between the first and the second magnetically conductive element. Thus, the first spacer element is also arranged above or on top of the first magnetically conductive element but below the second magnetically conductive element.

In this case, a length, in particular a maximum length, and/or a width, in particular a maximum width, of the first magnetically conductive element, the second magnetically conductive element and the at least one spacer element can be equal.

The proposed design of the first, the second magnetically conductive element and the spacer element advantageously allows a simple manufacturing and installation.

In another embodiment, the first magnetically conductive element, the second magnetically conductive element and the at least one spacer element are detachably connected. Detachably can e.g. mean that the elements can be dismantled non-destructively. Also, a mechanical connection between the elements can be provided by a force-fit and/or a form-fit connection. As will be explained later in more detail, the respective elements are preferably pressed together, e.g. by a housing. It is possible that the respective elements comprise at least one means for mechanically connecting said elements.

This advantageously allows keeping the desired distance between the first and the second magnetically conductive element constant over time. However, in particular if a spacer element is replaced by another spacer element with a different thickness (or height) in order to change the distance between the first and second magnetically conductive element, the proposed adjustment arrangement can be easily dismantled.

In another embodiment, spacer elements of varying heights are arrangeable in between the first magnetically conductive element and the second magnetically conductive element. In particular, spacer elements which have a height from a height interval ranging from 2 mm (inclusive) to 10 mm (inclusive) can be arrangeable in between the first and the second magnetically conductive element. Thus, the first and the second magnetically conductive element can be designed such that these spacer elements of varying heights can be arranged between said magnetically conductive elements. As mentioned before, the heights of the spacer elements can be chosen such that all inductance variations which are provided by the arrangement of one additional spacer element are equal.

This advantageously allows changing a distance between the first and the second magnetically conductive element which, in turn, allows adjusting the inductivity of the electric conductors.

In another embodiment, device comprises a housing, wherein the housing provides a mounting or receiving volume for the adjustment arrangement comprising at least the first magnetically conductive element, the second magnetically conductive element and the at least one spacer element.

The housing can comprise a cover part and a bottom part. The cover part and the bottom part can be attached to one another in order to provide the mounting volume. It is possible that the mounting volume is partially provided by the bottom part and partially provided by the cover part. However, it is also possible that the mounting volume is provided exclusively by the cover part or by the bottom part. The cover and the bottom part can comprise at least one connecting means to provide a mechanical connection between cover and the bottom part, in particular a detachable connection.

Moreover, the housing can have or provide an electric conductor receiving means, e.g. in the form of an opening, in particular a through-hole, more particular an opening in side walls, e.g. a front-sided and a rear-sided side wall. An electric conductor can extend through said openings and, if an adjustment arrangement is arranged within the mounting volume through the aforementioned through hole provided by the adjustment arrangement. Thus, the receiving means of the housing and the receiving means of the adjustment arrangement for receiving the electric conductor can be aligned in a state in which the adjustment arrangement is arranged within the mounting volume.

In particular, the housing can provide a mounting volume with a predetermined shape and/or predetermined dimensions. In particular, the mounting volume can be a cuboid volume with a predetermined length, a predetermined height and a predetermined width. More particular, the mounting volume can be provided for the reception of an adjustment arrangement comprising the magnetically conductive elements and at least two or even more than two spacer elements.

For example, the adjustment arrangement can be at least partially form-fitted into the mounting volume.

The housing advantageously allows receiving the aforementioned adjustment arrangement, wherein a stability of the assembly of elements of the adjustment arrangement within the mounting volume is ensured. Thus, the distance between the first and the second magnetically conductive element and thus the inductance changing characteristics of the proposed device can be kept constant over time.

In another embodiment, the mounting volume is larger than a minimum volume of an assembly comprising the first and the second magnetically conductive element. The minimum volume can e.g. denote a volume of an enveloping body of the assembly comprising only the first and the second magnetically conductive element, e.g. an assembly wherein the second magnetically conductive element is directly arranged above the first magnetically conductive element without any spacer element arranged in between the first and the second magnetically conductive element. In particular, the mounting volume can have a width and a length which is equal to the width or the length of said enveloping body but a height which is larger than the height of the enveloping body. In other words, the height of the mounting volume can be larger than the sum of the height of the first magnetically conductive element and the height of the second magnetically conductive element.

Moreover, the mounting volume, in particular the height of the mounting volume, can be larger than the minimum volume by a predetermined level, e.g. by 10% or 20%.

Also, the mounting volume can be equal to a maximum volume of the adjustment arrangement, wherein the adjustment arrangement comprises the first and the second magnetically conductive element and a spacer element with a maximum admissible height, e.g. a height of 10.0 mm, arranged in between the first and the second magnetically conductive element.

In another embodiment, a maximum height of the mounting volume is larger than or equal to the sum of the height of the first magnetically conductive element and the height of the second magnetically conductive element. Alternatively or in addition, a maximum width of the mounting volume is larger than or equal to the width of the first magnetically conductive element or a width of the second magnetically conductive element. Alternatively or in addition, a maximum length of the mounting volume is larger than or equal to the length of the first magnetically conductive element or a length of the second magnetically conductive element.

In particular, the maximum height of the mounting volume can be equal to a maximum height of the adjustment arrangement, wherein the maximum height the adjustment arrangement is provided if a spacer element with a maximum admissible height, e.g. a height of 10.0 mm, is arranged in between the first and the second magnetically conductive element.

Alternatively or in addition, a maximum width of the mounting volume can be larger than or equal to the maximum width of the adjustment arrangement. Alternatively or in addition, a maximum length of the mounting volume can be larger than or equal to the maximum length of the adjustment arrangement.

Preferably, a maximum height of the mounting volume can be larger than the sum of the height of the first magnetically conductive element and the second magnetically conductive element by at least or exactly 2.0 mm, by at least or exactly 10.0 mm or even more.

This advantageously allows arranging adjustment arrangements of different volumes, in particular of different heights, within the mounting volume, wherein a stable arrangement of the elements of the adjustment arrangement is ensured.

In another embodiment, the housing comprises or provides at least one spring element, wherein the at least one spring element is designed and/or arranged such that a spring force is exertable on an object, e.g. an adjustment arrangement, arranged the mounting volume, in particular on an object which fills the mounting volume completely or to a certain extent, e.g. more than 80% or 90% of the mounting volume.

It is, for instance, possible, that the at least one spring element is provided and/or arranged at or in a side wall, front-sided wall, a rear-sided wall, a bottom wall or a top wall enclosing the mounting volume. In uncompressed state, the at least one spring element can extend into the mounting volume. If an adjustment arrangement is arranged in the mounting volume, the spring element can be strained or stressed.

In particular, spring element can be provided by a tongue element which is cut free from a wall enclosing the mounting volume.

The spring element advantageously allows improving a stability of the assembly of the elements of the adjustment arrangement if arranged within the mounting volume.

The feature that the housing comprises or provides at least one spring element, wherein the at least one spring element is designed and/or arranged such that a spring force is exertable on an object arranged the mounting volume can provide an alternative for the feature that the adjusting arrangement comprises at least one additional spacer element, wherein the at least one spacer element is arranged outside an interspace in between the first and the second magnetically conductive element.

Thus, a device for adjusting an inductance of at least one electric conductor is described, wherein the device comprises an adjustment arrangement with a first magnetically conductive element and at least a second magnetically conductive element. Further, the adjustment arrangement comprises at least a first spacer element, wherein the at least first spacer element is arranged in between the first magnetically conductive element and the second magnetically conductive element. Further, the device comprises a housing, wherein the housing provides a mounting volume for the adjustment arrangement comprising the first magnetically conductive element, the second magnetically conductive element and the at least first spacer element. Further, the housing comprises or provides at least one spring element, wherein the at least one spring element is designed and/or arranged such that a spring force is exertable on an object, e.g. an adjustment arrangement, arranged the mounting volume, in particular on an object which fills the mounting volume completely or to a certain extent, e.g. more than 80% or 90% of the mounting volume. Such a device can provide subject-matter of an independent invention. Such a device can further comprise one or more feature(s) of one or more embodiment(s) disclosed in this invention.

In another embodiment, the housing comprises or provides at least one cooling medium access to the mounting volume. In particular, the cooling medium access can be provided by an opening in a wall enclosing the mounting volume. In particular, the opening can be designed as a through-hole or a slot. More particular, the at least one cooling medium access can be provided in a side wall of the housing, in particular a front-sided side wall and a rear-sided side wall.

This advantageously allows cooling the magnetically conductive elements during a current flow through the electric conductor which, in turn, increases an operational safety of the proposed device.

In another embodiment, a cover part and a bottom part of the housing are designed similar. This means that a cover part can also be used as a bottom part and vice versa. In this embodiment, both, the bottom part and the cover part, can provide a portion of the mounting volume. This advantageously reduces production costs for the housing.

In another embodiment, the housing is made of magnetically non-conductive material. In particular, the housing can be made of plastic, wood, celluloid, glass, rubber or ceramic or a mixture of at least two of these elements. Thus, the inductance of the electric conductor is only adjusted by the aforementioned adjustment arrangement.

It is further possible that the housing is made of a mixture of at least one magnetically non-conductive material, e.g. at least one of the aforementioned materials, with a thermally conductive material. The thermally conductive material can have a thermal conductivity which is higher than a predetermined threshold value, in particular higher than the thermal conductivity of the remaining material(s) of the mixture. For instance, the housing can be made of a mixture of plastic and ceramic, e.g. of a plastic material enriched with ceramic particles. This advantageously allows an improved dissipation of thermal energy from magnetically conductive element(s) and/or the spacer element(s).

In another embodiment, a cover part comprises or provides at least one attachment means for attaching the cover part to a bottom part and/or the bottom part comprises or provides at least one attachment means for attaching the bottom part to the cover part. In this case, the attachment means of the bottom part can be a corresponding attachment means which interacts with the attachments means of the cover part. In particular, the attachment means can provide a snap-fit connection of the cover part and the bottom part. In this case, the cover part can have a locking catch, wherein the bottom part has a corresponding locking connector. It is, however, obvious to the skilled person that other attachment means, in particular alternative designs can be chosen in order to provide a detachable or separable mechanical connection between the cover part and the bottom part.

In another embodiment, the housing comprises or provides at least one conductor clamping means. The at least one conductor clamping means can be designed and/or arranged such that an electric conductor which is received by the aforementioned conductor receiving means of the housing is fixed in a predetermined position and/or orientation or such that a change of the position and/or orientation of the received electric conductor is limited to positions and/or orientations of predetermined intervals.

The conductor clamping means can e.g. be designed as another tongue-like element. Such a tongue-like can e.g. extend into the opening of the housing for receiving the electric conductor(s) or can border said opening. If an electric conductor extends through the openings, the tongue-like element can be deformed, wherein a clamping force is exerted on the electric conductor by the clamping means. In particular, the electric conductor can be pressed onto a corresponding stop element, wherein the stop element limits the movement of the electric conductor. The stop element can also border the aforementioned opening. In particular, the at least one conductor clamping means can extend from a top portion, a bottom portion or a lateral portion of the housing towards a center region of the housing, in particular of a side wall of the housing.

Further proposed is a method for adjusting an inductance of an electric conductor. A device according to one of the previously described embodiments is attached to the electric conductor. The method comprised the following steps.

First, at least a first spacer element with a desired height or thickness depending on a desired inductivity or the desired inductance variation of the electric conductor is selected. The height can be a height of an interval between a minimum admissible height and a maximum admissible height. As explained before, the height of the at least one spacer element can define a distance between the first and the second magnetically conductive element in an assembled state of the adjustment arrangement. The change of the inductance of the electric conductor depends on the distance. The higher the distance, the smaller the change of inductance. In particular, the change of the inductance can depend on the distance in a hyperbolic fashion.

Further, the adjustment arrangement is provided by arranging the at least one spacer element in between the first magnetically conductive element and the second magnetically conductive element, in particular such that the desired minimal distance between the first and the second magnetically conductive element is provided. If the at least one spacer element is arranged in between the first and the second magnetically conductive element, in particular if the spacer element is arranged on top of the first magnetically conductive element and the second magnetically conductive element is arranged on top of the spacer element, the adjustment arrangement is in an assembled state. In the assembled state, an electric conductor receiving means, in particular an opening or through hole can be provided by the adjustment arrangement.

Further, the electric conductor is arranged within a conductor receiving section of the adjustment arrangement. In particular, the electric conductor can be inserted through the opening of the adjustment arrangement. In this case, the adjustment arrangement clasps around or encloses a section of the electric conductor.

Further, at least one additional spacer element is selected. The adjustment arrangement is provided by additionally arranging the at least one additional spacer element outside an interspace between the first and the second magnetically conductive element. In particular, the height of the at least one additional spacer element, preferably the heights of multiple additional spacer elements can be selected such that the dimensions of the adjustment arrangement in the assembled state correspond to, or are equal to dimensions of a mounting volume of a housing. This means that the assembled adjustment arrangement can be fit into the mounting volume.

The proposed method advantageously allows changing the inductance of electric conductor in a desired way, while an insulation effort is reduced, an installation requirement for additional elements, namely the proposed device, are minimized and an operational safety is ensured.

In another embodiment, the adjustment arrangement is arranged within a mounting volume of the housing. The housing has been explained before. Moreover, the electric conductor can be arranged within a conductor receiving portion of the housing, in particular be inserted through an opening of the housing. In an assembled state of aforementioned adjustment arrangement, a spring force which is generated by at least one spring element of the housing can be exerted onto the adjustment arrangement if said adjustment arrangement is arranged within the mounting volume. Further described is an embodiment, wherein an adjustment arrangement provided by arranging the at least one spacer element in between the first magnetically conductive element and the second magnetically conductive element, in particular an adjustment arrangement without an additional spacer element, is arranged within a mounting volume of the housing.

Further, at least one conductor clamping means can be provided by the housing by which the electric conductor(s) received by the receiving means of the housing can be fixed in predetermined position and/or orientation or in a position and/or orientation of a desired position and/or orientation interval.

It is possible that housing comprises bottom part and a cover part. In this case, the adjustment arrangement or elements of the adjustment arrangement can be arranged within a mounting volume portion of the bottom part such that an assembled state of the adjustment arrangement is provided. Then, the cover part can be arranged or attached to the bottom part. During said attachment, the portion of the assembled adjustment arrangement which is not arranged within the mounting volume portion of the bottom part is arranged within the remaining mounting volume portion of the cover part.

BRIEF DESCRIPTION OF THE DRAWINGS

The invention will be described with reference to the attached Figures. The figures show.

In the following, the same numerals denote elements with the same or similar technical feature.

DETAILED DESCRIPTION OF THE INVENTION

Figure 1:
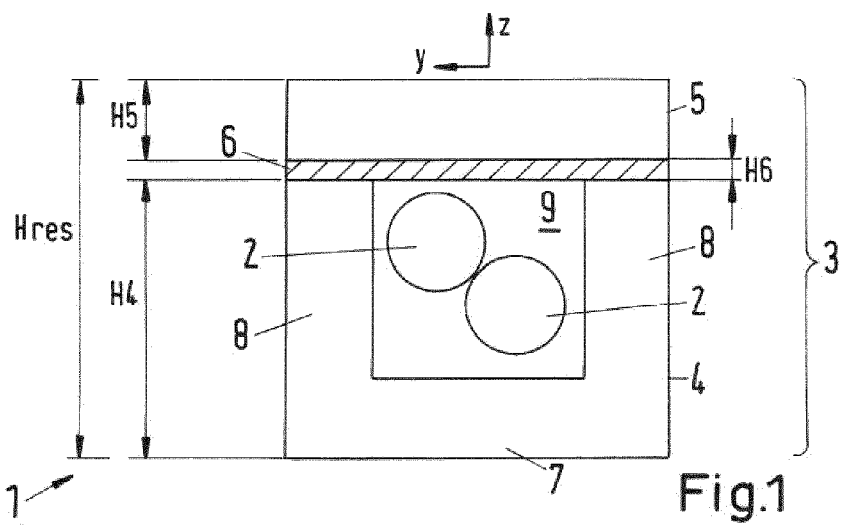
FIG. 1 a schematic side view of an adjustment arrangement.

FIG. 1 shows a schematic side view of a proposed device 1 for adjusting and inductance of electric conductors 2. The device 1 comprises an adjustment arrangement 3 with a first ferrite element 4, a second ferrite element 5 and a first spacer element 6. The adjustment arrangement 3 is shown in an assembled state. Further shown is a vertical axis z and a lateral axis y of a reference coordinate system wherein an arrowhead of the axes z, y indicate a vertical direction and a lateral direction respectively. In the assembled state, the first spacer element 6 is arranged above the first ferrite element 4, wherein the second ferrite element 5 is arranged above the first spacer element 6. The elements 4, 5, 6 are in contact to one another. It is shown that the first ferrite element 4 is a U-shaped ferrite element 4 which comprises a bottom portion 7 and two side wall portions 8. The bottom portion 7 extends along the lateral axis y wherein the side wall portions 8 extend along the vertical axis z. The first ferrite element 4 encloses an inner volume 9, which is part of an opening or a through-hole of the adjustment arrangement 3 in the assembled state. Within the inner volume 9, the electric conductors 2 are arranged. In particular, the electric conductors 2 extend through the opening of the adjustment arrangement 3. The second ferrite element 5 is an I-shaped element. This means that the second ferrite element 5 is designed as a ferrite bar. Further, the first spacer element 6 is also an I-shaped element. Thus, the first spacer element 6 is also provided by a bar.

It is shown that all elements 4, 5, 6 have the same width, wherein the width is measured along the lateral axis y. Not shown in FIG. 1 is that all element 4, 5, 6 have the same length, wherein the length can be measured along a longitudinal axis x (see e.g. FIG. 4). In FIG. 1, the longitudinal axis is oriented perpendicular to the projection plane and points away from an observer.

Further shown is that the first ferrite element has a height H4, the second ferrite element 5 has a height H5 and the first spacer element 6 has a height H6, wherein the heights H4, H5, H6 are measured along the vertical axis z. The height H6 of the first spacer element 6 can be chosen from an interval between a minimum admissible height, e.g. 0.2 mm, and a maximum admissible height, e.g. a height of 10 mm. In FIG. 1, the first spacer element 6 can e.g. have a height H6 of 10.0 mm. In this case, the sum of the heights H4, H5, H6 of the respective elements 4, 5, 6 can be equal to a desired resulting height Hres.

Figure 2:
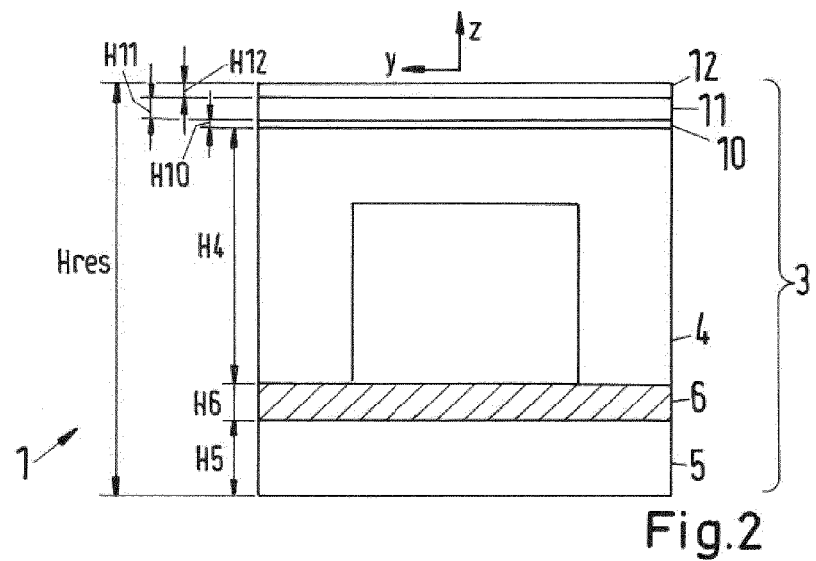
FIG. 2 a schematic side view of an adjustment arrangement in another embodiment, FIG. 3 a schematic side view of an adjustment arrangement in another embodiment, FIG. 4 a perspective view of a housing with an adjustment arrangement and electric conductors, FIG. 5 a front view of the housing shown in FIG. 4, and FIG. 6 a bottom part of a housing.

The height H6 of the first spacer element 6 defines a distance between the first ferrite element 4 and the second ferrite element 5. The inductance change of the inductance of the electric conductors 2 arranged within the inner volume 9 depends on said distance. FIG. 2 shows a schematic side view of a device 1 in another embodiment. As shown in FIG. 1, the device comprises and adjustment arrangement 3 with a first ferrite element 4, a second ferrite element 5 and a first spacer element 6. In addition to the embodiment shown in FIG. 1, the adjustment arrangement 3 of the device 1 shown in FIG. 2 further comprises a second spacer element 10, a third spacer element 11 and a fourth spacer element 12. Further shown are heights H4, H5, H6, H10, H11, H12 of the elements 4, 5, 6, 10, 11, 12 of the adjustment arrangement 3. The sum of the heights H4, H5, H6, H10, H11, H12 of all elements 4, 5, 6, 10, 11, 12 can be equal to the desired resulting Hres as shown in FIG. 1. It is, for instance, possible that the height H6 of the first spacer element 6 which is part of the adjustment arrangement 3 shown in FIG. 2 is smaller than the height H6 of the first spacer element 6 of the adjustment arrangement 3 shown in FIG. 1, e.g. smaller than 10.0 mm. In order to provide the same geometrical dimensions of the adjustment arrangement 3, at least one additional spacer element 10, 11, 12, has to be provided for the adjustment arrangement 3 shown in FIG. 2. The additional spacer elements 10, 11, 12 are arranged outside an interspace between the first and the second ferrite element 4, 5. In particular, the additional spacer elements 10, 11, 12 are arranged above the first ferrite element 4 in the embodiment shown in FIG. 2. It is, however, obvious to the skilled person that at least one or all of the additional spacer elements 10, 11, 12 can also be arranged below the second ferrite element 5. Depending on the configuration of the first and the second ferrite element 4, 5, e.g. in the case that the first ferrite element 4 is arranged below the second ferrite element 5, at least one or all of the additional spacer elements 10, 11, 12, can also be arranged below the first ferrite element 4 or above the second ferrite element 5.

Figure 3:
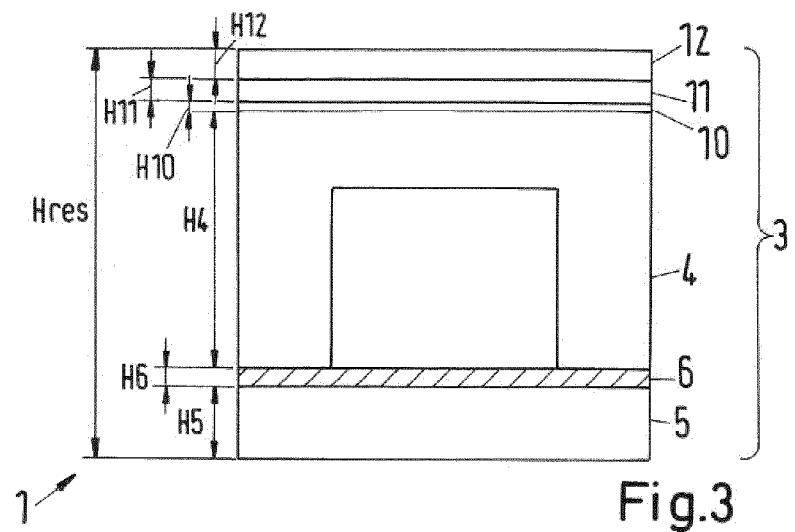

FIG. 3 shows a schematic side view of the device 1 in another embodiment. Again, the device 1 comprises an adjustment arrangement 3 with a first ferrite element 4, a second ferrite element 5, a first spacer element 6 and additional spacer elements 10, 11, 12. In the embodiment shown in FIG. 3, a height H6 of the first spacer element is smaller than the height H6 of the first spacer element 6 of the embodiment shown in FIG. 2. As a result, a height H12 of the third spacer element 12 of the embodiment shown in FIG. 3 is higher than the height H12 of the third spacer element 12 of the embodiment shown in FIG. 2. Thus, the same desired resulting height Hres is provided.

In the embodiment shown in FIG. 1, FIG. 2 and FIG. 3, an enveloping volume of the adjustment arrangement 3 has a cuboid shape, wherein the height of the enveloping volume equals to the desired resulting height Hres in all embodiments. However, the embodiments shown in FIG. 1, FIG. 2 and FIG. 3 will provide different changes of the inductance of the electric conductors 2 arranged within the inner volume 9 as the minimum distance between the first and the second ferrite element 4, 5 varies for the different embodiments.

Figure 4:
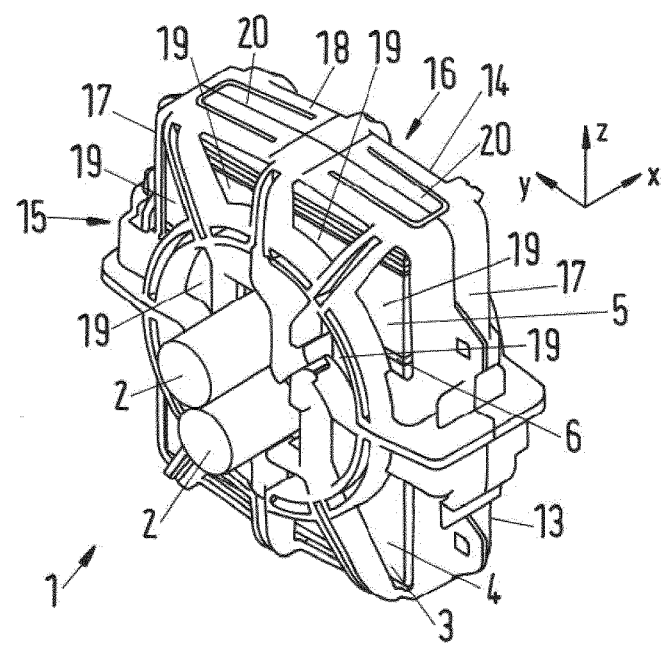

FIG. 4 shows a perspective view of a device with a housing in another embodiment. The housing comprises a bottom part 13 and a cover part 14. The bottom part 13 and the cover part 14 are designed similar. This can mean that the bottom and the cover part 13, 14 have the same shape and the same dimensions.

The bottom part 13 and the cover part 14 are hollow. In particular, each part 13, 14 has side walls and a bottom wall, wherein the side walls and the bottom wall enclose an inner volume which provides a portion of a mounting volume for an adjustment arrangement 3 (see FIG. 1-3). For the ease of explanation, only the cover part 14 will be described in detail. As both parts 13, 14 are designed similar the following description also applies to the bottom part 13.

The cover part 14 has a front side wall 15, a rear side wall 16, lateral side walls 17 and a bottom wall 18. Within the front and the rear side walls 15, 16 openings 19 are provided in order to provide a cooling medium access for e.g. air to the mounting volume. Further shown is that the housing comprises spring elements 20. The spring elements 20 are designed as tongue-like elements which are cut free in the bottom wall 18 of the cover part 14. The spring elements 20, in particular a portion at a free distal end of the spring elements 20, can extend into the inner volume closed by the walls 15, 15, 17, 18 of the cover part 14 in a relaxed state of the spring elements 20.

If an adjustment arrangement 3 with the predetermined desired resulting height Hres is arranged within the mounting volume of the housing in the assembled state of the housing, the spring elements 20 will be deformed by the adjustment arrangement 3 such that a spring force is exerted onto the adjustment arrangement 3 inserted within the mounting volume.

Figure 5:
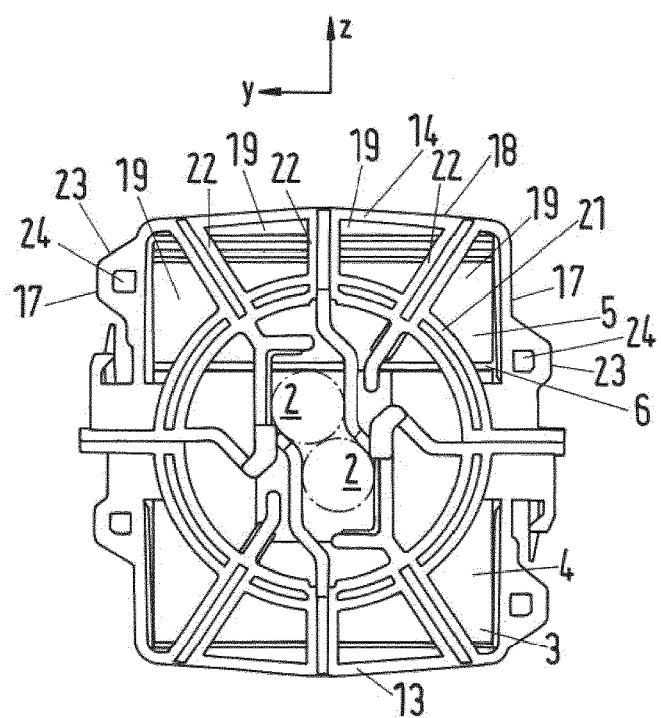

FIG. 5 shows a front view of the housing with the adjustment arrangement 3 shown in FIG. 4. It is shown that the cover part 14 comprises a ring bar 21 which has the form of a part-ring. In particular, the ring bar 21 extends along the circumference of a semi-circle. A ring-bar 21 is arranged on the front side wall and the rear side wall 15, 16, respectively. A geometric centre of the ring bar 21 can be arranged on a central longitudinal axis of the housing if the cover part 14 is attached to the bottom part 13.

Further shown are connecting bars 22 which extend from the bottom wall 18 to the ring bar 21. The connecting bars 22 can extend along a radial line of the semi-circle enclosed by the ring bar 21. It is shown that the bars 21, 22 are slotted, in order to provide further openings to the mounting volume.

Further shown are lateral extensions 23 or flanges of the cover part 14, wherein the lateral extensions 23 have a through-hole 24. The through-holes 24 can be used for fixing additional cable straps. By the cable straps, the cover part 14 and the bottom part 13 can be fixed together, in particular if the described attachment means are broken. Further, the ferrite elements 4, 5 and/or the spacer elements 10, 11, 12 (see e.g. FIG. 2 or FIG. 3) can be fixed to one another by a cable strap. Further, the housing with the adjustment arrangement 3 can be fixed to a supporting structure by such a cable strap.

Figure 6:
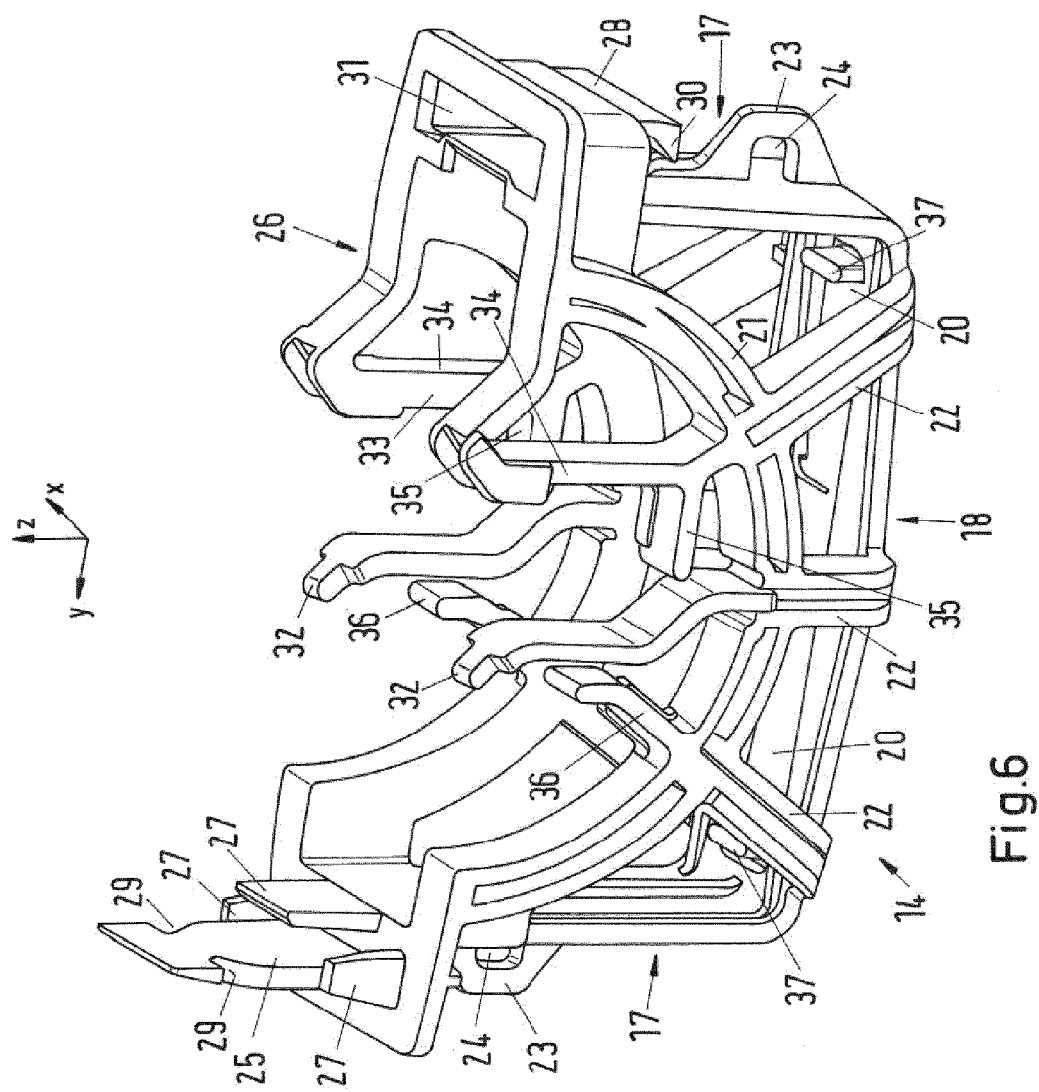

FIG. 6 shows a perspective view of a cover part 14. On a first lateral side wall 17, the cover part 14 has a latching element 25 which extends from a top side 26 of the cover part 14 along a vertical axis z. The top side 26 denotes the side opposite to the bottom wall 18 of the cover part 14. The latching element 25 is designed as a latching tongue with notches 29 arranged on side of the latching element 25. Thus, a hammerhead ending of the latching element 25 is provided. This advantageously increases clamping forces and reduces the risk of accidental opening of the housing. Further, the cover part 14 has latch connection guiding elements 27 to guide an attachment movement which also extend from the top side 26 along the vertical axis z.

On the opposite lateral side wall 17, the cover part 14 has or provides a corresponding latch receiving element 28 which is designed such that a latching element of a bottom part 13 can be received and a snap-fit connection can be provided. The latch receiving element 28 provides latching hooks or latching noses 30 which engage into a corresponding notch 29 of the latching element 25 in order to provide the snap-fit connection. Further shown is that the latch receiving element 28 provides a guide channel 31 for receiving the guide elements of the bottom part 13 (see e.g. FIG. 5).

The snap-function provided by the latching element 25 of the cover part 14 and the latch receiving element of a corresponding bottom part 13 advantageously allows a quick assembly in field. In particular, no tools and/or screws are required for assembly.

Further shown are conductor clamping bars 32. These conductor clamping bars 32 extend from a ring bar 21 into a volume which is partially enclosed by the ring bar 21. It is shown that the conductor clamping bars 32 substantially extend along the vertical axis z and have a partially bended, in particular S-shaped, course.

In particular, the clamping bars 32 extend towards a center region of the volume which is partially enclosed by a ring bar 21. A free distal end of the clamping bars 32 is, however, arranged with an offset to a center line of the cylindrical volume which is partially enclosed by the ring bar 21. Further shown is that the clamping bars 32 taper towards the distal end.

The shown design of the conductor clamping bars 32 advantageously allows to reliably clamp conductors, e.g. cables with different diameters, e.g. with a 10% diameter tolerance.

Further shown are stopping bars 33 which also extend from the ring bar 21 into said cylindrical volume. The stopping bars 33 can have a L-shape with a first leg 34 and a second leg 35. The first leg 34 can extend along the vertical axis z, wherein the second leg 35 can extend along the lateral direction y, wherein the vertical is oriented parallel to the vertical axis z and the lateral direction is oriented parallel to the lateral axis y. Electric conductors 2 (see e.g. FIG. 4) can be arranged in a volume enclosed by the clamping bars 32 and the stopping bars 33. In this case, the clamping bars 32 can be deformed or deflected such that a clamping force is exerted onto the electric conductors 2 arranged within the volume enclosed by the clamping bars 32 and the stopping bars 33. Thus, a stable arrangement of the electric conductors 2 is ensured.

At an upper end portion, the first leg 34 of a stopping bar can provide a groove for receiving tapered endings of the clamping bars 32 of a corresponding bottom part 13. The groove provides a counterpart for the tapered ending of a clamping bar 32. Thus, the tapered ending can fit into the groove if the cover part 14 is arranged on the bottom part 13. This allows guiding the clamping bars and increases a mechanical stability of the clamping bar 32 if an electric conductor 2 (see e.g. FIG. 1) cable is clamped. In particular, the risk of breaking of the cabling clamping bar 32 caused by shearing forces exerted by the electric conductor 2 is minimized.

The clamping function provided by the clamping bars 32 advantageously allows fixing the housing with the adjustment arrangement 3 on the electric conductor 2. Thus, no other fixation means for fixing the adjustment arrangement to the electric conductor is required.

Further shown is another stopping bar 36 which extends from the ring bar 21 towards a center region. Said stopping bar 36 stabilizes an adjustment arrangement 3 arranged within mounting volume provided by the cover part 14.

In FIG. 6, it is shown that the spring elements 20 (see also FIG. 4) have a spring nose element 37 at the free distal end of the tongue-like spring element 20. This spring nose element 37 extends from the spring element 20 into the inner volume enclosed by the cover part 14.

The invention claimed is:

1. A device for adjusting an inductance of at least one electric conductor, wherein the device comprises an adjustment arrangement having a first magnetically conductive element and at least a second magnetically conductive element,
   wherein the adjustment arrangement comprises at least a first spacer element arranged in between the first magnetically conductive element and the second magnetically conductive element, wherein the adjustment arrangement comprises at least one additional spacer element, wherein the at least one additional spacer element is arranged outside an interspace in between the first and the second magnetically conductive element, wherein the at least one additional spacer element is arranged below the first magnetically conductive element or above the second magnetically conductive element, wherein the adjustment arrangement provides a through-hole through which the at least one electric conductor extends,
   wherein the device comprises a housing providing a mounting volume for the adjustment arrangement and wherein the housing comprises at least one conductor clamping means.

2. The device according to claim 1, wherein the first magnetically conductive element is U-shaped or the second magnetically conductive element is I-shaped or the first spacer element is I-shaped.

3. The device according to claim 1, wherein the first magnetically conductive element, the second magnetically conductive element and the at least first spacer element are detachably connected.

4. The device according to claim 1, comprising spacer elements of varying heights, the spacer elements being arranged in between the first magnetically conductive element and the second magnetically conductive element.

5. The device according to claim 1, wherein the mounting volume is larger than a minimum volume of an assembly comprising the first and the second magnetically conductive element.

6. The device according to claim 1, wherein a maximum height of the mounting volume is larger than or equal to a sum of a height of the first magnetically conductive element and a height of the second magnetically conductive element or a maximum width of the mounting volume is larger than or equal to a width of the first magnetically conductive element or a width of the second magnetically conductive element or a maximum length of the mounting volume is larger than or equal to a length of the first magnetically conductive element or a length of the second magnetically conductive element.

7. The device according to claim 1, wherein the housing comprises or provides at least one spring element arranged such that a spring force is exertable on an object arranged within the mounting volume.

8. The device according to claim 1, wherein the housing comprises at least one cooling medium access to the mounting volume.

9. The device according to claim 1, wherein a cover part and a bottom part of the housing are similarly designed.

10. The device according to claim 1, wherein the housing is made of a magnetically non-conductive material.

11. The device according to claim 1, wherein a cover part comprises at least one attachment device for attaching the cover part to a bottom part or the bottom part comprises at least one attachment device for attaching the bottom part to the cover part.

12. A method for adjusting an inductance of at least one electric conductor, wherein a device according to claim 1 is attached to the at least one electric conductor, the method comprising:
   selecting the first spacer element with a desired height depending on a desired inductance of the at least one electric conductor,
   arranging the adjustment arrangement by providing the at least first spacer element in between the first magnetically conductive element and the second magnetically conductive element and by additionally arranging at least one additional spacer element outside an interspace between the first and the second magnetically conductive element, and arranging the at least one electric conductor within a conductor receiving section of the adjustment arrangement.

13. The method according to claim 12, wherein the adjustment arrangement is arranged within a mounting volume of a housing.

* * * * *